(No Model.)
F. M. MOORE.
GLOBE VALVE.
No. 481,803. Patented Aug. 30, 1892.
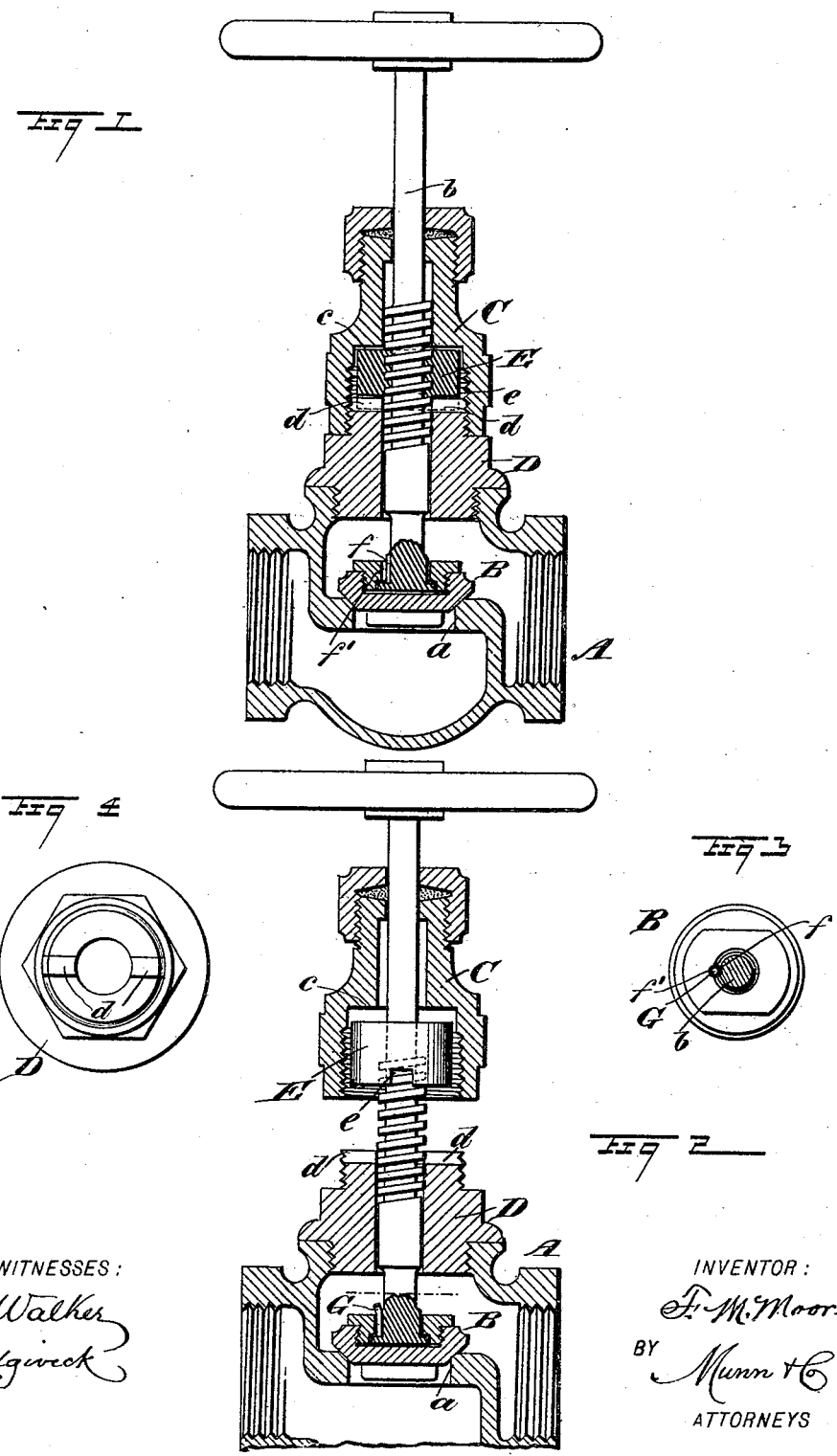
WITNESSES:
H. Walker
C. Sedgwick
INVENTOR:
F. M. Moore
BY
Munn & Co
ATTORNEYS

UNITED STATES PATENT OFFICE.

FRANK M. MOORE, OF SPRECKELSVILLE, HAWAII.

GLOBE-VALVE.

SPECIFICATION forming part of Letters Patent No. 481,803, dated August 30, 1892.

Application filed September 21, 1888. Serial No. 286,030. (No model.)

*To all whom it may concern:*

Be it known that I, FRANK M. MOORE, a citizen of the United States, residing at Spreckelsville, Maui, Hawaiian Islands, have invented an Improvement in Globe-Valves; and I hereby declare the following to be a full, clear, and exact description of the same.

My invention relates to globe-valves; and it consists in a novel improvement in the securing-nuts and in a novel improvement in the valve itself, said improvements having for their object the facilitating of a grinding and reseating of the valve.

Reference is to be had to the accompanying drawings, forming a part of this specification, in which similar letters of reference indicate corresponding parts in all the figures.

Figure 1 is a vertical sectional elevation showing the parts in their normal positions. Fig. 2 is a like view with the parts adjusted for grinding the valve. Fig. 3 is a section on line 3 3, Fig. 2; and Fig. 4 is a plan view of valve-bonnet detached.

Referring to the parts, the shell A is of the ordinary form, with a valve-seat $a$ for the valve-head B, which is normally held loosely on the valve-stem $b$ in the usual manner. The valve-bonnet D engages the shell A by a threaded connection and is formed with a bore of such a diameter relatively to the valve-stem $b$ as to permit the free movement of the stem in either a rotary or a longitudinal direction. Adjacent to the bonnet D a nut E, of preferably rounded exterior, is fitted on the threaded portion of the valve-stem, said nut E having recesses $e$ in its inner face or end for receiving corresponding projections $d$, that are formed on the juxtaposed face or end of the bonnet D. A case C is arranged on the valve-stem and incloses the nut E completely, the inner end of the said case being formed with an internal thread that engages the threaded outer end of the bonnet D. An internal shoulder $c$ is formed on the case C, which shoulder bears against the end of the nut D, whereby when the said case C is screwed home on the bonnet D the nut E will be securely held against longitudinal movement in turning the valve-stem. The usual packing-gland of the valve-stem is fitted thereon beyond the case C and engages the latter by a threaded connection, as shown. By this construction it will be seen that the packing-gland and packing will not be unduly affected either by the ordinary operation of the stem or in regrinding; also, the nut E is the only part of the steam-fittings that is subjected to wear, and the said nut may be renewed from a piece of brass procurable from the stock of any supply-store, and the valve may thus by renewing the nut be restored to perfect condition at a trifling cost, whereas in previous valves the renewal of the wearing parts is not more economical than the discarding of the whole valve.

In order to provide for the temporary locking of the valve-head B to its stem for the purpose of regrinding, I form a longitudinal groove $f$ in the stem $b$ and a corresponding longitudinal groove $f'$ in the nut F of the valve-head. With the recesses $ff'$ brought into register any convenient piece of wire or even a splint of wood will serve as a wedge to lock the head against independent movement, as the strain on the wedge is not so great as where the locking device is inserted laterally through the nut and stem, and even the lacerating or breaking of the splint or wire will not release the head; also, the stem is not weakened by a longitudinal slot in its periphery, as it is when bored transversely. To regrind the valve, the valve-head having been locked to its stem and the nut E and case C having been disengaged from the bonnet D, the valve-stem is free to be turned on its seat, the bonnet D serving as a steady and secure guide. A wire G is shown locking the valve-head in place in Figs. 2 and 3.

Having thus described my invention, what I claim as new, and desire to secure by Letters Patent, is—

1. In a globe-valve, the combination, with the shell, of the valve-stem guiding-bonnet D, screwed thereto, the casing C, screwed at its inner end to the outer end of the bonnet and having an internal chamber of greater diameter than the bore of the bonnet, a nut E beyond the outer end of the bonnet and lying entirely within the chamber in casing C, and means for preventing the nut from rotating, the valve-stem having a valve on its inner end and having a threaded section operating through the nut, the said stem where it passes through the bonnet being of a diameter to be firmly guided in the bore thereof and said stem being of a length to permit the casing to be moved outward thereon when the nut is to be disconnected from the bonnet to grind the valve, substantially as set forth.

2. In a globe-valve, the combination, with the shell and the partially-threaded valve-stem, of the valve-stem guiding-bonnet D, screwed to the shell and having transverse projections $d\ d$ across its outer end, the nut E, wholly beyond and abutting at its inner end the outer end of the bonnet and transversely notched, as at $e\ e$, to receive said projections, the bore of the bonnet being of a diameter to form a guide to steady the valve-stem during the grinding of the valve, the casing C, screwed to the bonnet and having an internal chamber wholly inclosing the nut, and a gland on the outer end of the casing, the valve-stem being of a length to permit the casing and its gland to be moved outward sufficiently to disconnect them and the nut from the bonnet to grind the valve, the bonnet then serving to steady the spindle and prevent it from moving laterally, substantially as set forth.

In witness whereof I have hereunto set my hand.

FRANK M. MOORE.

Witnesses:
S. M. YETLESEN,
EDWIN OMSTED.